(12) United States Patent
Neuhaus

(10) Patent No.: US 8,915,481 B2
(45) Date of Patent: Dec. 23, 2014

(54) MAGNETICALLY ACTUABLE VALVE

(75) Inventor: Dietmar Neuhaus, Düsseldorf (DE)

(73) Assignee: Deutsches Zentrum fur Luft—und Raumfahrt e.V., Cologne (DE)

( * ) Notice: Subject to any disclaimer, the term of this patent is extended or adjusted under 35 U.S.C. 154(b) by 342 days.

(21) Appl. No.: 11/997,341

(22) PCT Filed: Jun. 19, 2006

(86) PCT No.: PCT/EP2006/063307
§ 371 (c)(1),
(2), (4) Date: Jan. 30, 2008

(87) PCT Pub. No.: WO2007/014796
PCT Pub. Date: Feb. 8, 2007

(65) Prior Publication Data
US 2008/0224077 A1    Sep. 18, 2008

(30) Foreign Application Priority Data

Jul. 30, 2005  (DE) .................. 10 2005 035 878

(51) Int. Cl.
*F16K 31/02* (2006.01)
*F16K 31/06* (2006.01)
*F16K 25/00* (2006.01)
*H01F 7/08* (2006.01)

(52) U.S. Cl.
CPC ............ *F16K 31/0651* (2013.01); *F16K 25/00* (2013.01); *F16K 31/0662* (2013.01); *F16K 31/0675* (2013.01); *H01F 7/081* (2013.01)
USPC ................................ 251/129.14; 251/129.21

(58) Field of Classification Search
CPC .......................... F16K 31/0651; F16K 31/0665
USPC ............... 251/129.01, 129.04, 129.15, 129.2, 251/129.21, 129.22, 129.14; 137/630.17, 137/625.28, 901
See application file for complete search history.

(56) References Cited

U.S. PATENT DOCUMENTS 1,757,059 A * 5/1930 Rickenberg ................... 137/637
2,056,322 A * 10/1936 Hoppe ...................... 251/129.14
3,245,652 A * 4/1966 Roth ......................... 251/129.14

(Continued)

FOREIGN PATENT DOCUMENTS

| DE | 2003799 | 8/1971 | |
|---|---|---|---|
| DE | 2541033 | 3/1977 | |
| DE | 10359852 | 6/2005 | |
| EP | 1052441 A2 * | 11/2000 | .............. F16K 31/06 |
| EP | 1055854 A2 | 11/2000 | |
| FR | 1289519 A | 7/1962 | |
| JP | 2001-524184 | 11/2001 | |
| JP | 2004-063879 | 2/2004 | |
| JP | 2006-043448 | 2/2006 | |
| JP | 2007-239051 | 9/2007 | |

OTHER PUBLICATIONS

Machine Translation of EP 1052441 A2; Neuhaus, Dietmar; Nov. 2000.*

*Primary Examiner* — Kevin Murphy
(74) *Attorney, Agent, or Firm* — Fulwider Patton LLP

(57) ABSTRACT

The magnetically actuable valve has an interior space which is surrounded by a magnetizable wall and in which a valve body can move, closing a valve opening in the closed position. The magnetic circuit includes at least one intermediate piece made from nonmagnetic material, while the wall and the valve seat consist of magnetizable material. As a result of the valve body being arranged eccentrically or as a result of the intermediate pieces being arranged asymmetrically, the magnetic flux density is increased on one side, so that the valve body moves onwards towards this side from the valve opening.

20 Claims, 4 Drawing Sheets

(56) References Cited

U.S. PATENT DOCUMENTS

| | | | |
|---|---|---|---|
| 3,443,585 A | * | 5/1969 | Reinicke .................. 137/595 |
| 3,543,797 A | * | 12/1970 | McNutt et al. ............. 137/628 |
| 3,828,818 A | | 8/1974 | Hunt |
| 4,531,679 A | * | 7/1985 | Pagdin ..................... 239/585.1 |
| 4,544,985 A | * | 10/1985 | Metz et al. ................. 361/144 |
| 4,682,508 A | * | 7/1987 | Steiner et al. .............. 73/866.5 |
| 4,880,206 A | | 11/1989 | Lungu |
| 5,370,320 A | * | 12/1994 | Sofer ...................... 239/585.1 |
| 5,653,422 A | | 8/1997 | Pieloth et al. |
| 6,095,189 A | * | 8/2000 | Ben-Shalom ............. 137/606 |
| 2004/0195278 A1 | * | 10/2004 | Leeuw ...................... 222/504 |

* cited by examiner

MAGNETICALLY ACTUABLE VALVE

RELATED APPLICATIONS

This application is a U.S. national phase of PCT/EP2006/063307, filed June 19, 2006, which claims priority from German Application No. 102005035878.0, filed July 30, 2005.

The invention relates to a magnetically actuable valve comprising an interior space delimited by at least one wall made of a magnetizable material, said interior space including a valve seat with an outflow opening formed therein, and comprising a magnet arrangement generating a magnetic circuit with a magnetic flux extending within the magnetizable wall, and comprising a valve body arranged to move within said interior space, the magnetizable wall including at least one discontinuity site whereby the magnetic field is deformed and where the magnetic field is caused to exit from the wall towards the valve body.

In DE 199 22 414 C1 (DLR), a magnetic valve is described wherein the valve body is pressed into the valve seat alone by the pressure difference between the valve inlet and the valve outlet. The valve will open when a magnetic field acting laterally on the valve body moves the valve body away from the valve opening. For this purpose, the valve body is formed as a magnetizable ball. The magnetizable wall of the valve housing includes, at the height of the valve body, a discontinuity site which is effective to deform the magnetic field and where the magnetic field subjects the valve body to a force oriented parallel to the valve seat. Under the effect of the discontinuity site, the magnetic flux is caused to proceed from the wall to the valve body and from the latter back to the wall. The magnetic flux passing through the valve body is a measure of the force by which the valve body is moved away from the valve opening. The magnetic valve will close when, after the magnetic field has been switched off, the valve body is carried back to the valve opening already by the flow alone. The magnetizable wall together with the valve body forms a magnetic circuit. To make it possible that a generated magnetic tension will bring about the largest possible magnetic flux through the valve body, it is of advantage when the magnetic resistance in the magnetic circuit is kept as low as possible.

It is an object of the invention to provide a magnetically actuable valve which is capable to exert a large force onto the valve body.

The valve according to the invention comprises the features of claim 1. As defined therein, the valve seat is magnetizable and together with the wall forms the magnetic circuit, while the magnetic flux proceeds from the wall through the valve body and the valve seat and is effective to pull the valve body laterally away from the outflow opening.

U.S. Pat. No. 3,828,818 describes a fluid control valve wherein a ball-shaped valve body is arranged in an interior space. The outflow opening is surrounded by a valve seat. A coil is operative to generate a magnetic field by which the valve body is moved away from the valve seat in axial direction so as to open the outflow opening.

Also U.S. Pat. No. 4,880,206 describes a magnetically controlled fluid valve wherein, upon activation of a coil, the valve body is moved axially to the flow direction. The valve seat is arranged at the inflow opening and is not magnetizable.

FR 1298519 B describes a fluid valve wherein a tube is surrounded by a coil. The tube includes a limited portion of a ferromagnetic material on one side. Upon activation of a coil, a valve ball is sucked away from the valve seat and is pulled laterally to the ferromagnetic portion. The tube like the valve seat is made of a nonmagnetic material.

Since the valve seat, forming the bottom of the interior space, is included in the magnetic circuit, the magnetic flux lines pass through the air only for a relatively short distance. In this regard, it is of particular advantage when the valve body is arranged close to the wall because this will render it possible to keep the air gap very small. In this manner, the magnetic dissipation losses are merely low. The magnetic flux can thus proceed from the valve body via the valve seat and into the wall with low magnetic resistance.

The valve seat forms the bottom of the valve and thus a termination of the interior space. Preferably, the valve seat is in direct abutting contact with the wall, thus avoiding an additional air gap. The valve body has the function of closing the opening of the valve seat.

The reduced magnetic resistance of the valve of the invention is effective, with the magnetic potential remaining unchanged, to cause a higher magnetic flux, thus increasing the force acting on the valve body and enlarging the maximum pressure differential between the valve inlet and the valve outlet which would still allow the valve to be opened.

According to a preferred embodiment of the invention, it is provided that the discontinuity site of the magnetizable wall comprises an intermediate piece having a magnetic conductivity lower than that of the wall. Such an intermediate piece has the effect that the magnetic flux lines will exit from the wall at the site of the intermediate piece when a body with a higher magnetic permeance is located in the vicinity of the discontinuity site. It is this type of body which is formed by the valve body. The discontinuity site can consist of an interspace forming an air gap, or of a solid material, preferably a nonmagnetic material such as plastic, for instance.

According to a first embodiment of the valve of the invention, the interior space is of a round shape, and the valve seat comprises a valve opening arranged eccentrically to the interior space. This configuration creates the required asymmetry for moving the valve body away from the valve opening, which is made possible by the out-of-center position of the valve opening.

According to a second embodiment, the magnetizable wall is on opposite sides thereof provided with discontinuity sites of different lengths. Generated in this manner is an asymmetry where the magnetic attraction acting on the valve body is increased in a preferred direction.

The valve can be equipped with one valve body or also a plurality of valve bodies. In case of a plural number of valve bodies arranged to cooperate with the same valve seat, each valve body is arranged eccentrically in the interior space.

Embodiments of the invention will be explained in greater detail hereunder with reference to the drawings.

In the drawings, the following is shown:

Figure 1:
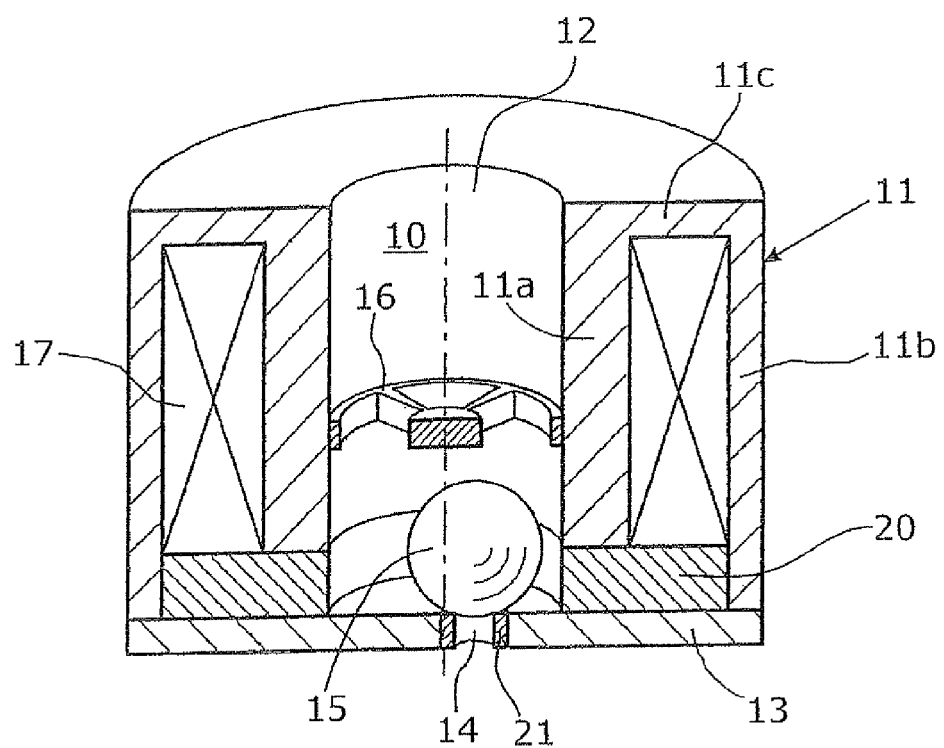
FIG. 1 is a longitudinal sectional view of a first embodiment of the valve of the invention.
Figure 2:
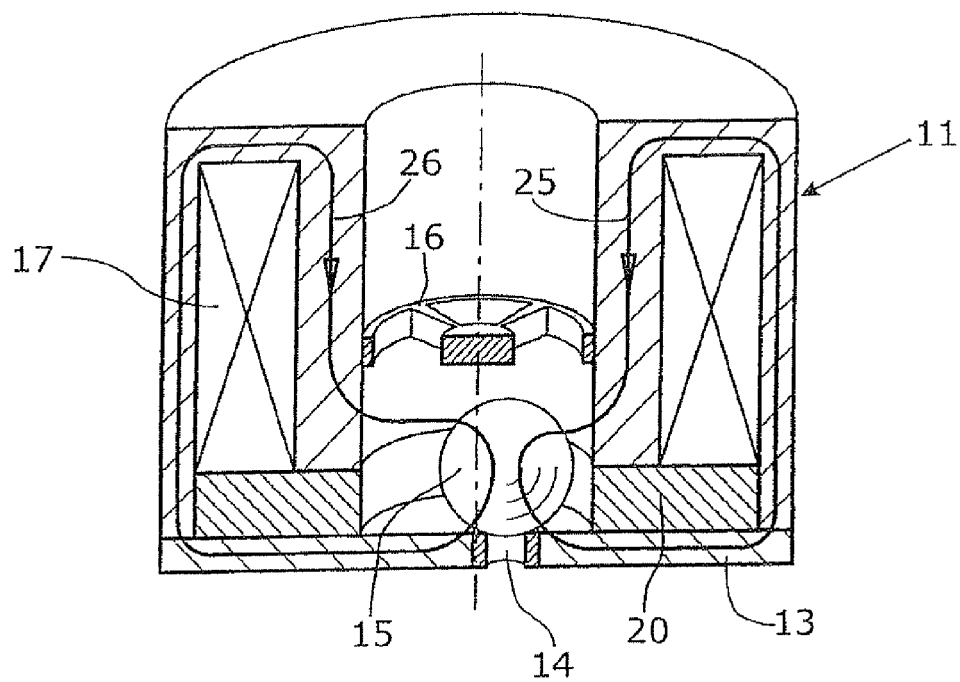
FIG. 2 illustrates the same valve as in FIG. 1, with schematic indication of the magnetic flux lines.

The valve as shown in FIGS. 1 and 2 comprises a cylindrical interior space 10 surrounded by a toroidal wall 11. The interior space 10 comprises an axial inflow opening 12 and, on the opposite end, a valve seat 13 having a valve opening 14 forming the outflow opening. Arranged within the interior space is the valve body 15 which is preferably ball-shaped and is adapted to tightly close the valve opening 14. Within interior space 10, valve body 15 is arranged to be moved in parallel to valve seat 13 as well as vertically to the valve seat. The upward movement of valve body 15 is limited by a stopper member 16 arranged within interior space 10.

Toroidal wall 11 contains, internally of a annular hollow space, a magnet arrangement 17 in the form of a coil of electrically conductive wire. Magnet arrangement 17 surrounds, in annular fashion, an inner leg 11a of wall 11. Magnet arrangement 11 itself is in turn enclosed by an outer leg 11b of wall 11. Inner leg 11a and outer leg 11b are on their upper ends connected to each other by an annular yoke 11c. Wall 11 with the legs 11a and 11b and the yoke 11c forms a body of magnetizable material, particularly iron or magnetizable stainless steel. Outer leg 11b is in direct surface contact with valve seat 13. Valve seat 13 is a plate delimiting the interior space 10 in the downward direction and is likewise made of a magnetizable material.

On valve seat 13, a disk-shaped intermediate piece 20 is supported and fastened thereto, consisting of a material of lower magnetic permeance. The permeance can also be zero. The outer leg 11b of wall 11 stands on valve seat 13, whereas the inner leg 11a terminates at an axial distance from valve seat 13. This distance is filled by the annular intermediate piece 20. The magnet arrangement 17 is arranged to rest on the upper side of intermediate piece 20. Towards the inside, intermediate piece 20 is flush with interior space 10. The intermediate piece is arranged at a height level occupied by the valve body 15 in the closed position of the valve, and has a thickness substantially corresponding to the radius of valve body 15.

Valve opening 14 is arranged in valve seat 13 eccentrically relative to the longitudinal axis of interior space 10 so that, in the closed position, valve body 15 is arranged out-of-center. Valve opening 14 is surrounded by a sealing insert 21 made of an elastic material acting as a seal. Alternatively, the sealing insert can be a precisely machined body of a hard material (ceramic, hard metal). The sealing insert 21 does not necessarily have to be made of magnetizable material.

FIG. 2 is a view similar to FIG. 1 but additionally provided with magnetic flux lines 25 and 26. It can be seen that, under the influence of intermediate piece 20, the magnetic flux lines are respectively diverted out of wall 11 into interior space 10. The magnetic flux laterally exiting from wall 11 proceeds via the magnetizable valve body 15 into the valve seat 13 and from there through the outer leg 11b of the wall. In the visual representation given in FIG. 2, the magnetic flux 25 schematically indicated on the right-hand side has to pass through a smaller air gap than the magnetic flux 26 on the left which is weakened by the wide air gap between wall and valve body. Consequently, the magnetic flux 25 will pull the valve body 15 to the right in FIG. 2 whereby the valve opening 14 will be opened. The opening path of the valve body is very small, so that the opening takes place quickly. The magnetic fluxes 25 and 26 will of course be generated only when the magnet arrangement 17 is activated by current flow. This occurs when the valve body 15 is to be moved away from its seat and the valve opening is to be cleared.

Figure 3:
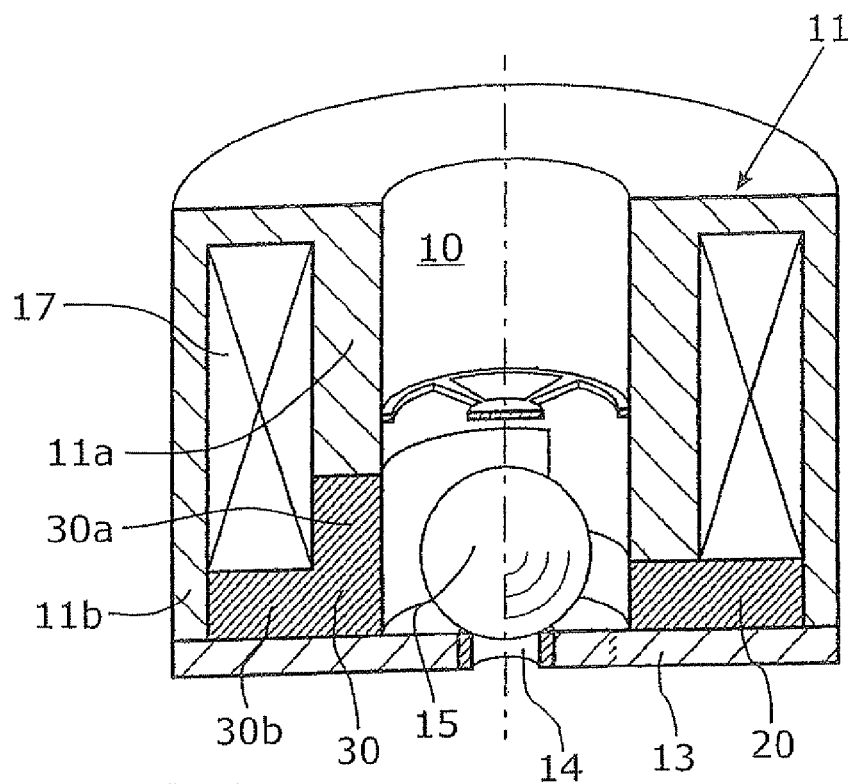
FIG. 3 is a view of a second embodiment of the valve.
Figure 4:
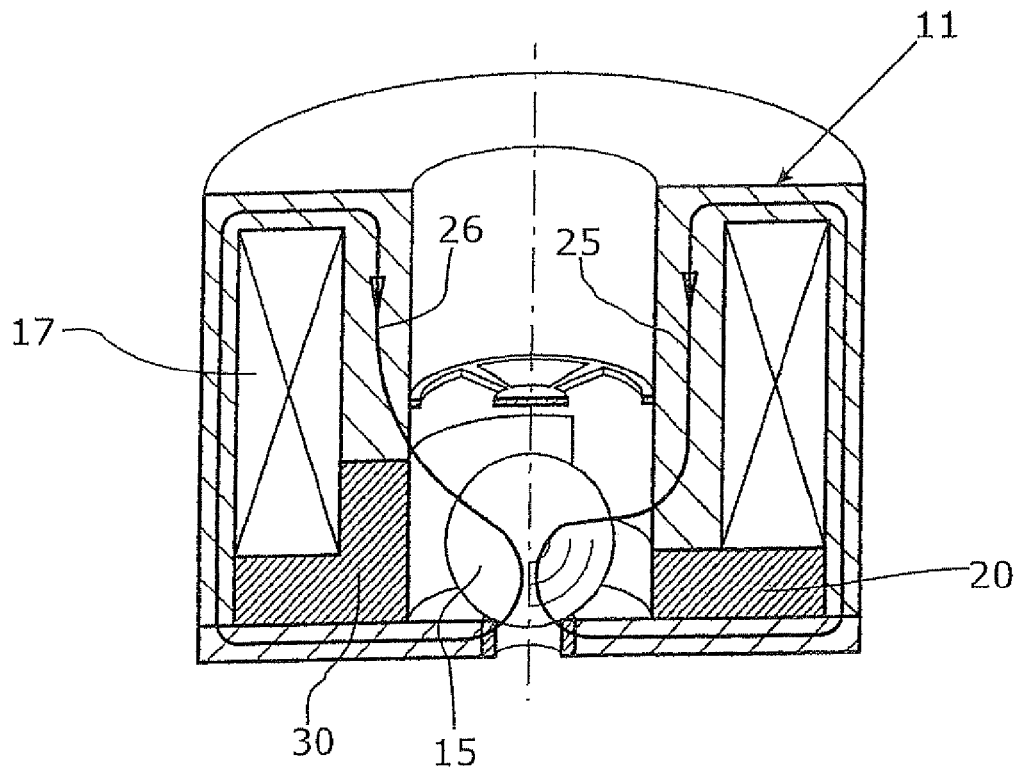
FIG. 4 illustrates the same embodiment as in FIG. 3, with schematic indication of the magnetic flux lines.

The embodiment according to FIGS. 3 and 4 differs from the first embodiment solely in that the valve opening 14 is arranged relative to the interior space 10 in a central position, i.e. on the axis of the interior space, so that the distance to the wall 11 is identical in all directions. For generating magnetic fields of different strengths on opposite sides of valve body 15, the discontinuity sites on both sides have different lengths. Provided on a portion of the periphery of wall 11 is an intermediate piece 20 corresponding to the intermediate piece 20 of the first embodiment. On another portion of said periphery, there is provided an intermediate piece 30 having larger axial dimensions than intermediate piece 20. Intermediate piece 30 includes a cylindrical vertical leg 30a configured to merge into the shortened inner leg 11a of wall 11, and a flange portion 30b extending at a right angle from leg 30a while resting in surface contact on valve seat 13 and extending in outward direction all the way to the leg 11b of the wall.

As evident from FIG. 4, the different lengths of the discontinuity sites will generate different dispersions of the magnetic fluxes 25 and 26 into the interior space 10. In the region of valve body 15, the magnetic flux 25 is more concentrated than the magnetic flux 26 which under the effect of the longer nonmagnetic intermediate piece 30 is dissipated more strongly. As a result, valve body 15 will be moved to the right-hand side in FIG. 4 upon activation of the magnet arrangement 17.

Thus, in this embodiment, valve body 15 when in its closed position is arranged centrally, and there is generated a non-symmetrical magnetic field which is operative to drive the valve body parallel to valve seat 13.

The height of leg 30a substantially corresponds to the diameter of the ball-shaped valve body 15 but alternatively can be distinctly larger.

Figure 5:
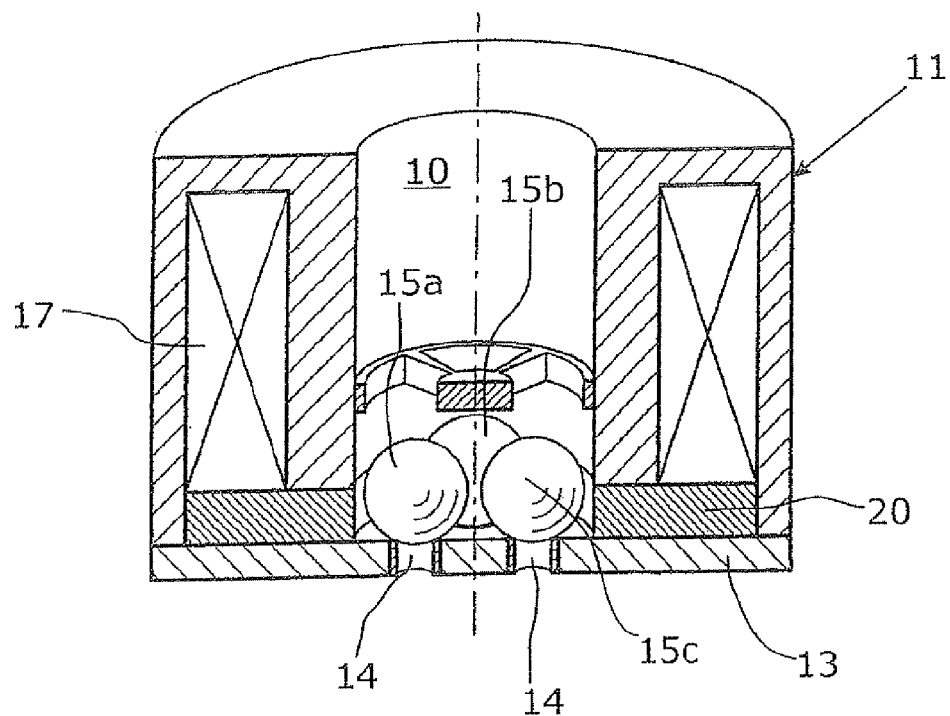
FIG. 5 is a view of a third embodiment of the valve.
Figure 6:
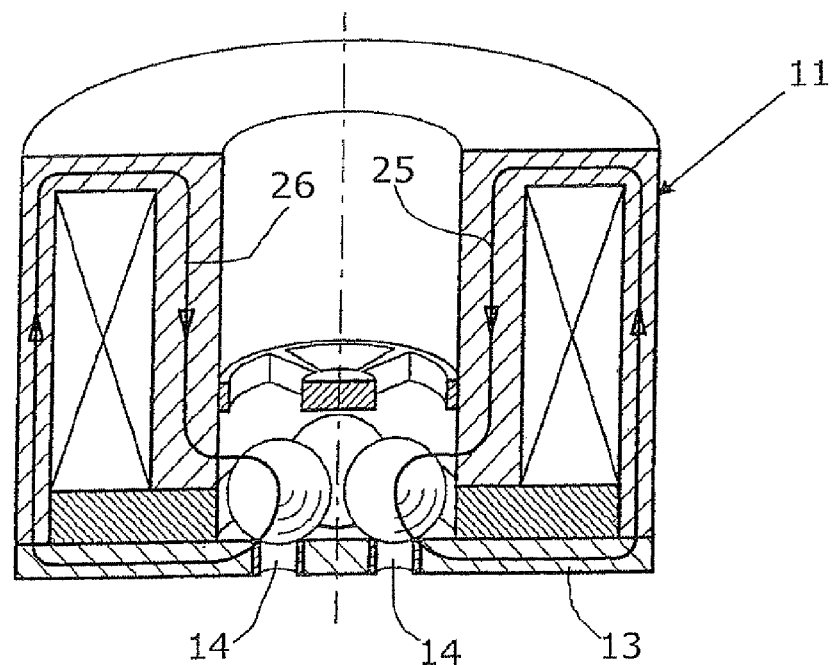
FIG. 6 illustrates the embodiment of FIG. 5, with schematic indication of the magnetic flux lines.

The embodiment according to FIGS. 5 and 6 comprises a plurality of ball-shaped valve bodies 15a, 15b, 15c within a sole valve. The intermediate piece 20 in this embodiment is of a symmetric configuration; however, each valve body when in its closed position is arranged asymmetrically within interior space 10, i.e. it is arranged outside of the longitudinal axis of the interior space. Thereby, under the influence of the magnetic force, each of the balls will be rolled toward wall 11.

Figure 7:
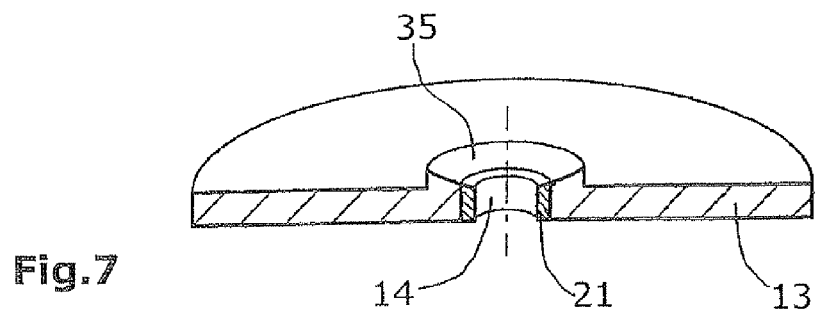
FIG. 7 illustrates the configuration of the valve seat with integrally formed socket and a valve seat included therein.

FIG. 7 shows a shaped valve seat 13 formed integrally with a socket 35 surrounding the valve opening 14. Socket 35 is configured as a funnel around the valve opening. Due to its funnel shape, socket 35 reduces the average gap width between the valve body and the valve seat, thus decreasing the magnetic resistance between the valve body and the valve seat. Also in this example, a sealing insert 21 is provided.

Figure 8:
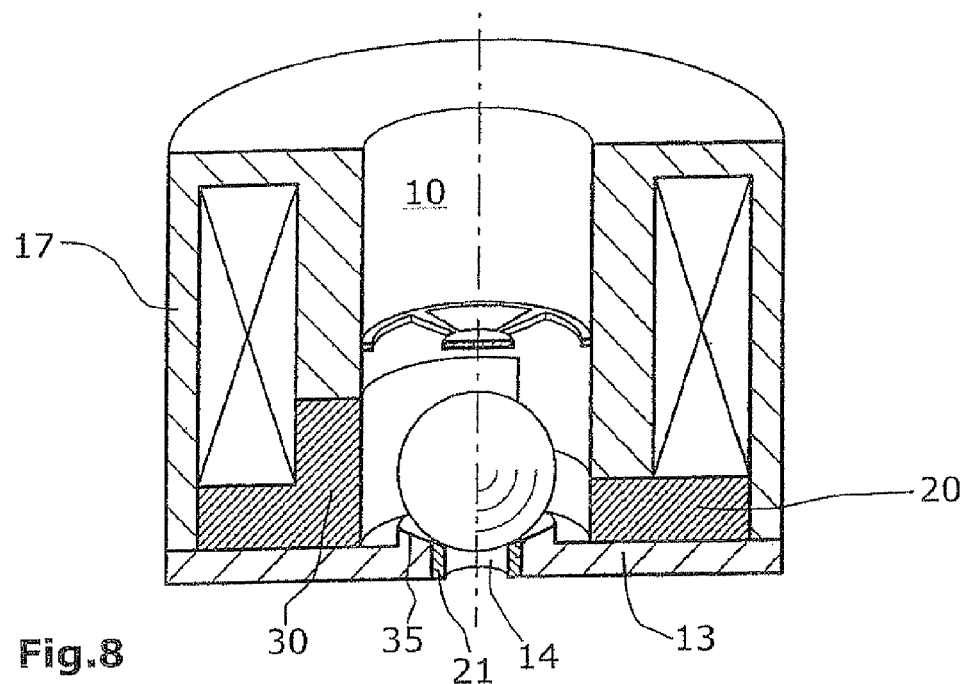
FIG. 8 is a view of a further embodiment of the valve comprising the valve seat shown in FIG. 7.
Figure 9:
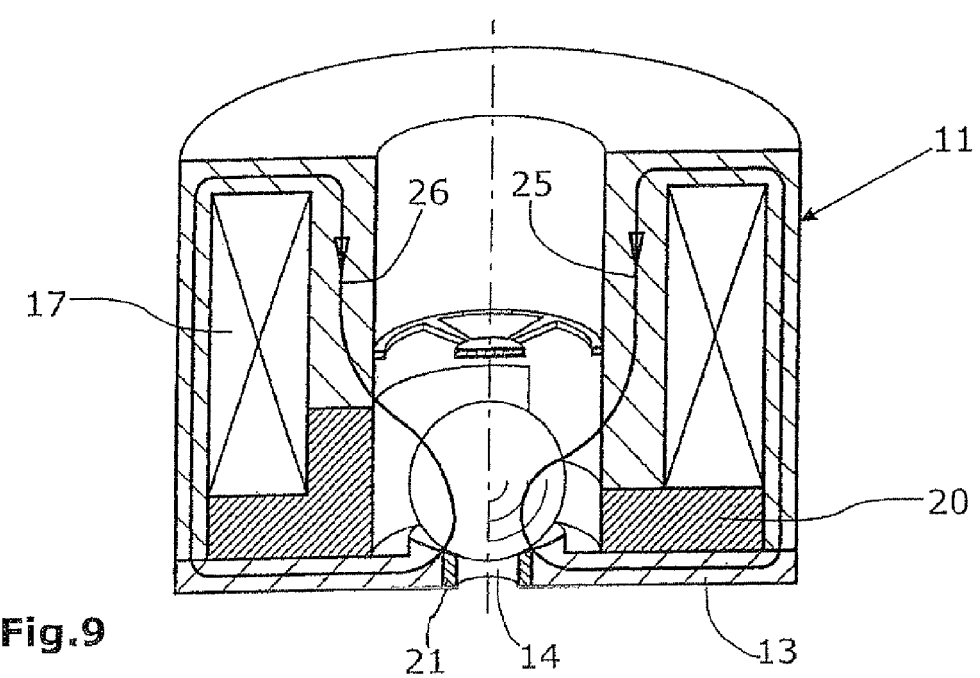
FIG. 9 illustrates the same valve as in FIG. 8, with schematic indication of the magnetic flux lines.

FIGS. 8 and 9 show the magnetic valve of the invention comprising a shaped valve seat 13 with integrally formed socket 35. In this example, there are again provided two dissimilar intermediate pieces 20 and 30 whereby an asymmetrical magnetic field will act on the valve body 15 so that the latter can roll on the valve seat 13.

I claim:

1. A magnetically actuable valve, comprising an interior space delimited by at least one wall made of a magnetizable material, said wall including an inner leg and an outer leg, said interior space including a valve seat formed of material that is magnetizable so as to be magnetic only when subjected to a magnetic field with an outflow opening formed therein defining a centerline that extends perpendicular to a plane defined by the outflow opening, and comprising a magnet arrangement surrounding, in annular fashion, the inner leg of the wall, said magnet arrangement generating a magnetic circuit with a magnetic flux extending within the magnetizable wall, and comprising a valve body arranged to move within said interior space while in direct contact with said valve seat, the magnetizable wall including at least one discontinuity site, the discontinuity site being located between the inner leg and the valve seat, whereas the inner leg terminates at an axial distance from the valve seat, wherein at said discontinuity site the magnetic field is deformed and is caused to exit from the wall into the interior space and towards the valve body, wherein the valve seat is magnetizable by the magnet arrangement and conducts the magnetic flux to the outer leg and together with the wall forms the magnetic circuit, the magnetic flux proceeding from the wall through the valve body and the valve seat and is effective to pull the valve body laterally away from the center line of the outflow opening toward the inner leg of the wall.

2. The valve according to claim 1, wherein said discontinuity site comprises an intermediate piece arranged in the wall at the height of the closing position of the valve body and having a magnetic conductivity lower than that of the wall.

3. The valve according to claim 2, wherein the intermediate piece is made of nonmagnetic material.

4. The valve according to claim 1, wherein the interior space is round and the valve seat comprises a valve opening arranged eccentrically to the interior space.

5. The valve according to claim 1, wherein the interior space is round and that the magnetizable wall is on opposite sides thereof provided with discontinuity sites of different lengths.

6. The valve according to claim 1, wherein the valve opening provided in the valve seat comprises a sealing insert.

7. The valve according to claim 1, wherein the valve opening provided in the valve seat is surrounded by a funnel-shaped socket.

8. The valve according to claim 1, wherein a plurality of valve bodies are arranged to cooperate with the same valve seat, and that each of said valve bodies when in its closed position is arranged eccentrically in the interior space.

9. The valve according to claim 1, wherein the inner leg does not directly contact the valve seat.

10. The valve according to claim 1, wherein the outer leg is in direct surface contact with the valve seat.

11. The valve according to claim 10, wherein the inner leg does not directly contact the valve seat.

12. A magnetically actuable valve, comprising:
at least one wall made of a magnetizable material, the wall including an inner leg, an outer leg and an interior space defined by the inner leg;
a magnet arrangement disposed between the inner leg and outer leg for generating a magnetic circuit which creates a magnetic flux extending within the magnetizable wall;
a valve seat formed of material that is magnetizable by the magnet arrangement, the valve seat including an outflow opening formed therein defining a centerline that extends perpendicular to a plane defined by the outflow opening;
a valve body arranged to move within the interior space while in direct contact with the valve seat; and
at least one intermediate piece located between the inner leg and the valve seat to form a discontinuity site, wherein the valve seat is magnetizable by the magnet arrangement and together with the wall forms a magnetic circuit, the magnetic field created by the magnetic arrangement being deformed by the discontinuity site to cause the magnetic field to exit from the wall towards the valve body, the discontinuity site being located between the inner leg and the valve seat, whereas the inner leg terminates at an axial distance from the valve seat, wherein at said discontinuity site the magnetic flux created by the magnetic circuit proceeds from the wall through the valve body and the valve seat to magnetically move the valve body laterally away from the centerline of the outflow opening.

13. The valve according to claim 12, wherein the magnetic flux flows to the outer leg of the magnetizable wall.

14. The valve according to claim 13, wherein the outer leg is in direct contact with the valve seat.

15. The valve according to claim 12, wherein the intermediate piece has a magnetic conductivity lower than that of the wall.

16. The valve according to claim 12, wherein the intermediate piece has varying lengths to vary the strength of the magnet field.

17. The valve according to claim 12, wherein the intermediate piece is made of nonmagnetic material.

18. The valve according to claim 12, wherein the interior space is round and the valve seat comprises a valve opening arranged eccentrically to the interior space.

19. The valve according to claim 12, wherein the interior space is round and that the magnetizable wall is on opposite sides thereof provided with discontinuity sites of different lengths.

20. The valve according to claim 12, wherein a plurality of valve bodies are arranged to cooperate with the same valve seat, and that each of said valve bodies when in its closed position is arranged eccentrically in the interior space.

* * * * *

UNITED STATES PATENT AND TRADEMARK OFFICE
CERTIFICATE OF CORRECTION

PATENT NO. : 8,915,481 B2
APPLICATION NO. : 11/997341
DATED : December 23, 2014
INVENTOR(S) : Dietmar Neuhaus It is certified that error appears in the above-identified patent and that said Letters Patent is hereby corrected as shown below:

Title page, Item 75 should be changed to Item 76

Title page, Item 73 Assignee, delete "Deutsches Zentrum fur Luft--und Raumfahrt e.V."

Signed and Sealed this
Sixteenth Day of February, 2016

Michelle K. Lee
*Director of the United States Patent and Trademark Office*